United States Patent
Sham et al.

(10) Patent No.: US 6,279,458 B1
(45) Date of Patent: Aug. 28, 2001

(54) RAPID BREW AUTOMATIC COFFEE MAKER

(76) Inventors: John C. K. Sham, The Redhill Peninsula, House No. 50, Cedar Drive, 18 Pak Pat Shan Rd., Hong Kong (HK); Kumkit Kunavongvorakul, 889 Thai C.C. Tower, 18th Floor, Rm 183 South Sathorn Road, Yannawa, Sathorn Bangkok Thailand, 10120 (TH)

( * ) Notice: Subject to any disclaimer, the term of this patent is extended or adjusted under 35 U.S.C. 154(b) by 0 days.

(21) Appl. No.: 09/385,274

(22) Filed: Aug. 30, 1999

(51) Int. Cl.⁷ ........................................ A47J 31/00
(52) U.S. Cl. ................ 99/281; 99/293; 99/305; 99/307; 99/285
(58) Field of Search ............................ 99/281, 283, 293, 99/307, 305, 294, 285; 426/433, 435, 425

(56) References Cited

U.S. PATENT DOCUMENTS

| | | |
|---|---|---|
| 1,467,171 | 9/1923 | Kelly . |
| 2,637,266 | 5/1953 | Grado ................................. 99/293 |
| 2,638,839 | 5/1953 | Raiteri ................................. 99/283 |
| 3,100,434 * | 8/1963 | Bunn ................................. 99/305 X |
| 3,261,279 | 7/1966 | Kaplan et al. ..................... 99/282 |
| 3,348,468 | 10/1967 | Eisendrath ........................ 99/282 |
| 3,354,810 | 11/1967 | Lorang ............................... 99/282 |
| 3,443,508 | 5/1969 | Reynolds et al. ................. 99/282 |
| 3,619,561 * | 11/1971 | Smit ................................... 99/281 X |
| 3,869,968 * | 3/1975 | Ihlenfeld .......................... 99/294 X |
| 4,039,771 * | 8/1977 | Thorsoe et al. .................. 99/281 X |
| 4,094,233 | 6/1978 | Martin ............................... 99/305 |
| 4,095,086 | 6/1978 | Ohnmacht et al. ................ 219/283 |
| 4,200,039 * | 4/1980 | Anderl ............................... 99/281 X |
| 4,204,465 | 5/1980 | Knecht ............................... 99/293 |
| 4,565,121 * | 1/1986 | Ohya et al. ........................ 99/293 X |
| 4,599,937 | 7/1986 | Ghione .............................. 99/293 |
| 4,667,584 | 5/1987 | Koyama et al. .................. 99/280 |
| 4,713,253 | 12/1987 | Stone ................................. 426/433 |
| 5,267,506 | 12/1993 | Cai ..................................... 99/280 |
| 5,404,794 | 4/1995 | Patel et al. ........................ 99/280 |
| 5,842,407 | 12/1998 | Schmed ............................. 99/290 |

* cited by examiner

Primary Examiner—Reginald L. Alexander
(74) Attorney, Agent, or Firm—Peter S. Canelias

(57) ABSTRACT

An automatic, household drip-type coffee making machine with a main housing for receiving and holding a carafe or decanter, and having an method and apparatus for rapidly heating water to form an infused beverage such as coffee. The speed brewing system has an automatic water level sensing system with a float box, a lever and a micro-switch, which detects the level of water in the water tank and when the water reaches a pre-selected level, activates a water heater located within a water bladder, heating the water bladder to a temperature sufficient to vaporize the water passing into the water bladder. The water vapor condenses along a water outlet tube while still retaining sufficient heat to brew an infused beverage. The heated water (condensed water vapor) reaches a shower nozzle plate and is dispensed through the shower nozzle plate into a filter basket which contains a filter and material for making an infused beverage such as regular or decaffeinated coffee. The brewing process commences inside of the filter basket and infused beverage drips into the decanter or carafe, as is common in automatic drip-type coffee making devices. Towards the end of the brewing process, the amount of water remaining in the water tank is gradually reduced, and at a pre-selected level, the float box will return to its original position, which will release a trigger on the micro-switch, causing the electric circuit to open and shut off the power to the device, thus concluding the entire brewing cycle.

9 Claims, 3 Drawing Sheets

RAPID BREW AUTOMATIC COFFEE MAKER

BACKGROUND OF THE INVENTION

The invention relates to an automated drip-type coffee making machine with a main housing for receiving and holding a carafe or decanter, and having an method and apparatus for rapidly heating water to form an infused beverage such as coffee. The speed brewing system has an automatic water level sensing system with a float box, a lever and a micro-switch, which detects the level of water in the water tank and when the water reaches a pre-selected level, activates a water heater located within a water bladder, heating the water bladder to a temperature sufficient to rapidly vaporize the water passing into the water bladder. The water vapor condenses along a water outlet tube while still retaining sufficient heat to brew an infused beverage. The heated water (condensed water vapor) reaches a shower nozzle plate and is dispensed through the shower nozzle plate into a filter basket which contains a filter and material for making an infused beverage such as regular or decaffeinated coffee. The brewing process commences inside of the filter basket and infused beverage drips into the decanter or carafe, as is common in automatic drip-type coffee making devices.

Towards the end of the brewing process, the amount of water remaining in the water tank is gradually reduced, and at a pre-selected level, the float box will return to its original position, which will release a trigger on the micro-switch, causing the electric circuit to open and shut off the power to the device, thus concluding the entire brewing cycle.

SUMMARY OF THE INVENTION

In accordance with the present invention, there is provided an improved drip-type household coffee maker with a water level sensing system;

Another object of this invention is to provide an improved drip-type coffee maker with a float box and micro-switch for automatically initiating and terminating the brewing cycle based on the water level in the water tank;

Another object of this invention is to provide a method and apparatus for rapidly heating water to form an infused beverage;

Another object of this invention is to provide a method and apparatus for rapidly heating water by means of a water bladder which vaporizes the introduced water;

Another object of this invention is to provide a method and apparatus for rapidly heating water by means of a water outlet tube which allows the water vapor to condense while retaining sufficient heat to brew an infused beverage.

BRIEF DESCRIPTION OF THE DRAWINGS

The above-mentioned and other features and objects of this invention and the manner of obtaining them will become apparent and the invention itself will be best understood by reference to the following description of an embodiment of the invention taken in conjunction with the accompanying drawings, wherein.

DETAILED DESCRIPTION

The invention relates to an automated drip-type coffee making machine with an improved automatic power on/off system for sensing the amount of water in a water tank and automatically turning the power to the brewing system on or off depending on whether sufficient water is present in the water tank to initiate or terminate the brewing cycle. The invention employs an improved speed brew water heating system which converts water from the tank into water vapor, and provides means for condensing the water vapor to heated water at a temperature sufficient to brew an infused beverage prior to introduction of the heated water into a filter basket containing a filter and beverage making material.

Figure 1:
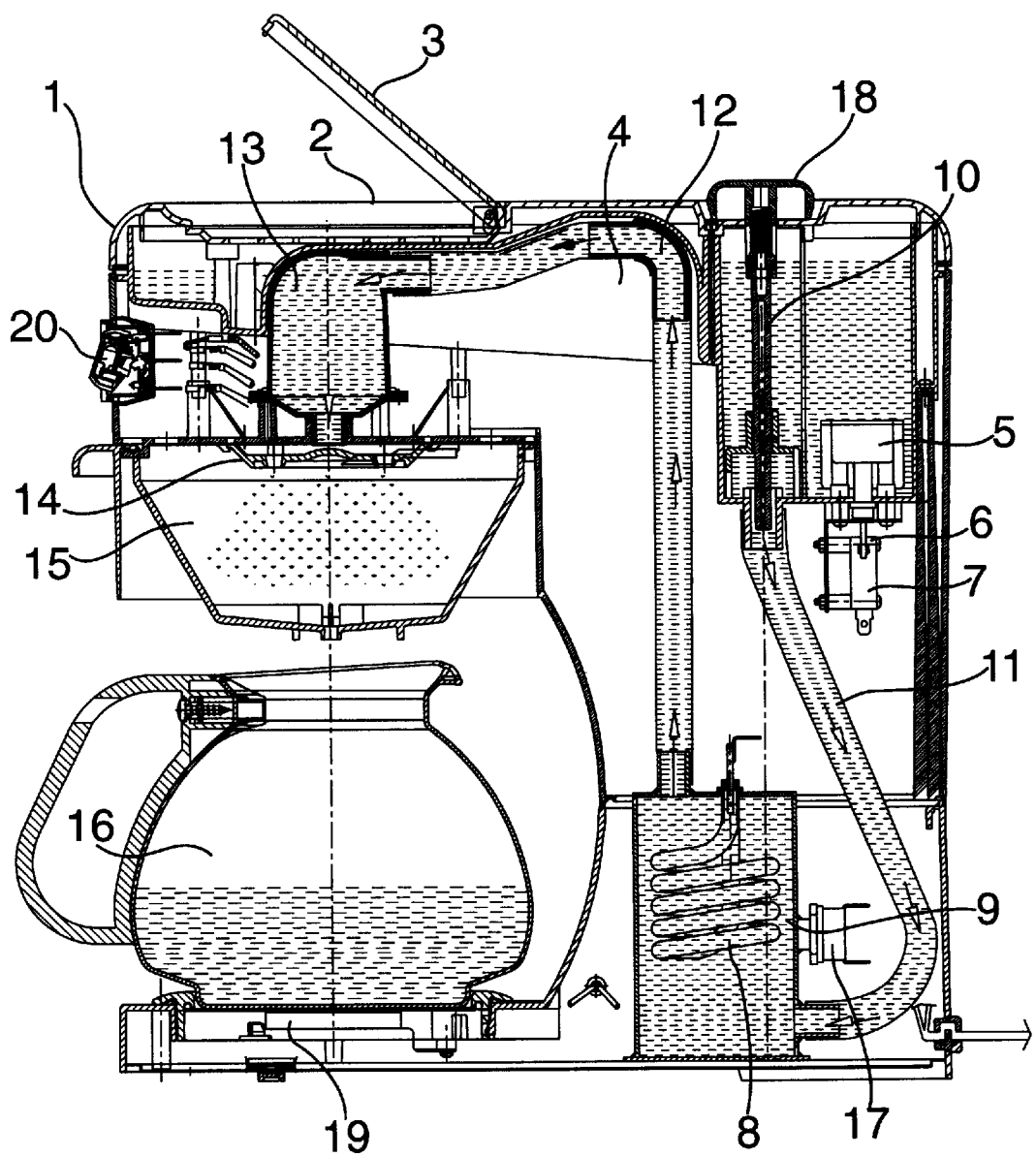
FIG. 1 is a side plan view of the preferred embodiment of the invention disposed within a conventional household coffee machine with the carafe in place.

Referring now to the drawings, FIG. 1 illustrates a preferred embodiment of the invention. The figure shows a main housing (1) which is preferably configured for containing the brewing system and working parts of the device, thus shielding the working components from view and providing an attractive appearance. It is possible, however, that portions of the housing could be formed of a transparent or translucent material in order to permit viewing of certain aspects of the brewing process, such as the level of water held in the device as measured by the number of standard six ounce cups of infused beverage that the detected water will brew. The housing (1) is of conventional form found in many household coffee making machines of the drip brewing type. The housing (1) has a top portion which preferably has a water inlet (2) and a water inlet cover (3). The water inlet cover (3) is preferably in the form of a lid hingeably attached to the housing and disposed above the water inlet (2) in the housing (1). The water inlet (2) is in communication with a water tank (4). The water inlet cover (3) is preferably formed of a thermoplastic resin, and is configured to have an open and a closed position relative to the water inlet (2), so that in the open position water may be introduced into the water tank (4) by means of the water inlet (2). Where the water inlet cover (3) is in the closed position, contaminants such as dust and other detritus are thereby prevented from being introduced into the water inlet (2) and into the water tank (4). The capacity of the water tank (4) is preferably sufficient to hold water to brew ten to twelve cups, i.e., between forty-eight and sixty ounces of an infused beverage.

The device is equipped with a float box (5) located in the water tank (4). The float box (5) is preferably formed of material such as a thermoplastic resin, and has sufficient properties, either in the material from which it is formed or by one or more hollow, sealed enclosures or air pockets located within the float box (5), so as to impart buoyancy to the float box (5) sufficient to function for the purposes of this invention. The float box (5) has a lever (6), preferably made of steel, which cooperates with a micro-switch (7). The micro-switch (7) is electrically engaged with an electric circuit which supplies power for the water heating and brewing cycle.

When sufficient water is introduced into the water tank (4), and the level of water in the water tank (4) reaches a pre-selected level, the float box (5) is raised by buoyancy in the water, and the lever (6) is thereby forced into engagement with the micro-switch (7). Upon activation by the lever (6), the micro-switch (7) closes the electric circuit and allows electric power to flow to a heater (8). The heater (8) is preferably located within a water bladder (9), and is preferably in the form of an immersion type heating element in the shape of a coil, and preferably formed of aluminum, aluminum alloy, or other metal or alloy with similar heat transmitting properties. The heater (8) is capable of rapidly vaporizing water within the water bladder (9) so as to quickly transport the vapor without a pump.

Water from the water tank (4) passes through a dropper pin (10), which is preferably formed of Nylon or similar material. The dropper pin (10) is used to control the flow rate of the water from the water tank (4) to the water bladder (9), via a water inlet tube (11). The water inlet tube (11) is preferably formed of silicone rubber, or a material with similar properties. When water from the water tank (4) has passed through the dropper pin (10) and through the water inlet tube (11) into the water bladder (9), the heater (8) heats the water in the water bladder (9) until the water is vaporized. The heater (8) is preferably of sufficient heat generating and transmitting capacity that the vaporization is completed relatively quickly.

The water vapor generated by the heating of the water in the water bladder (9) passes through a water outlet tube (12) and begins to condense along the water outlet tube (12). The water outlet tube (12) is preferably formed of silicone rubber or other similar material. The condensed water, being immediately condensed from vapor, retains sufficient heat to brew an infused beverage. The heated water flows along the water outlet tube (12) and reaches a water outlet chamber (13) which collects the now condensed, heated water that has passed from the water outlet tube (12). The water outlet chamber (13) is in fluid communication with the water outlet tube (12), and is preferably formed of heat resistant Nylon or similar material. Collected heated water in the water outlet chamber flows through a shower nozzle plate (14). The shower nozzle plate (14), preferably formed from a thermoplastic material and having a plurality of perforations therethrough, dispenses the heated water over the beverage making material contained within a filter basket (15). The filter basket (15) is preferably formed from a thermoplastic material, and is conventionally configured to hold a filter. The heated water introduced into the filter basket (15) combines with the beverage making material such as ground coffee, and thereby forms an infused beverage which flows under force of gravity through the beverage making material and surrounding filter through a lower opening in the filter basket (15) and into a decanter or carafe (16). The carafe (16) is preferably formed of glass with thermal properties allowing for adequate expansion and contraction upon introduction of the heated infused beverage, and also to allow heating by means of a keep-warm heating plate (19).

As the brewing cycle continues, the amount of water in the water tank (4) decreases, thereby reducing the water level in the water tank (4). When the water level reaches a pre-selected level, the float box (5) lowers to its original position, releasing, by means of lever (6) micro-switch (7). When the micro-switch (7) is released, the circuit of which it is a part is opened, thereby shutting off the electrical power to the heater (8).

As seen from the above description, the combination of the float box (5), the lever (6) and the micro-switch (7) functions as a safety control on the water heating process. The purpose of this safety feature is to prevent a "dry boil" condition from developing within the water bladder (9). When power to the heater (8) is interrupted, due to the reduced level of water in the water tank (4), some water will remain within the water bladder (9) to prevent the overheating of the heater (8) and thus avoid creating a dry boil condition.

There is also preferably included a thermostat (17) which functions as a back-up safety feature in the event that there is any malfunctioning of the micro-switch (7). When the micro-switch (7) is in the closed position, the thermostat (17) which is preferably mounted on the exterior surface of the water bladder (9), will interrupt the main power supply when the temperature of the exterior surface of the water bladder exceeds a pre-selected temperature. The above described safety features allow the device to rapidly brew an infused beverage safely, and allow the brewing of a ten-cup carafe of infused beverage in about seven minutes.

The device may also have a water-flow speed control knob (18), which allows the user to manually adjust the rate of flow of the water into the dropper pin (10), and thus provide a faster or slower rate of brewing. The device preferably has a keep-warm heating plate (19), which is located beneath the decanter or carafe and is preferably controlled by a separate switch (20) so that the heating plate (19) may maintain the temperature of the infused beverage in the decanter or carafe, preferably at a minimum of eighty-five decrees centigrade.

Figure 3:
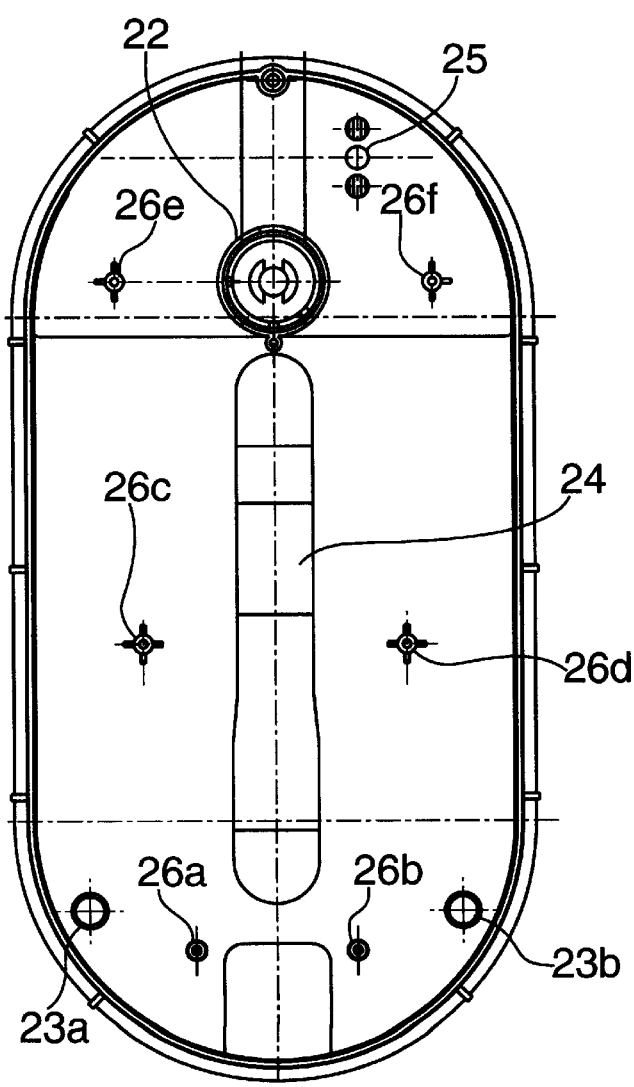
FIG. 3 is a top view of the water tank assembly of the preferred embodiment of the invention with the top cover of the housing removed.
Figure 2:
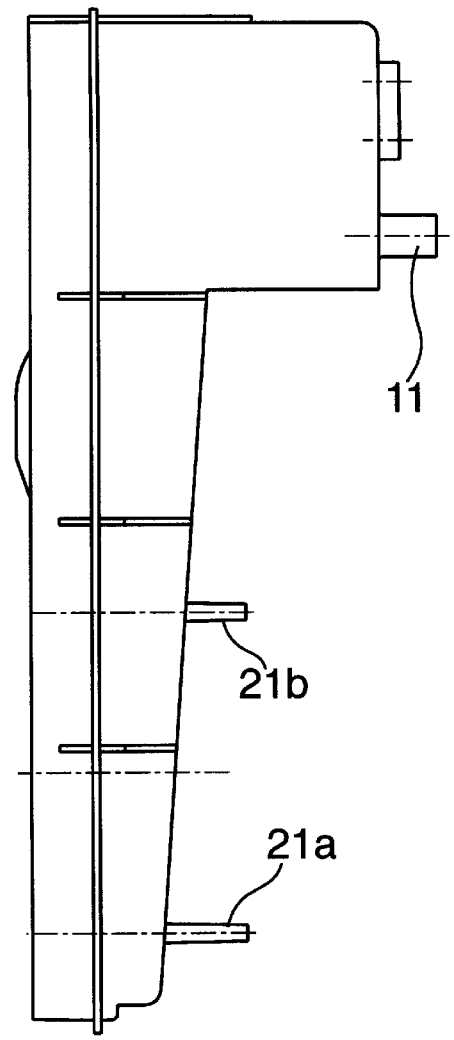
FIG. 2 is a side view of the water tank.
Figures 4, 5:
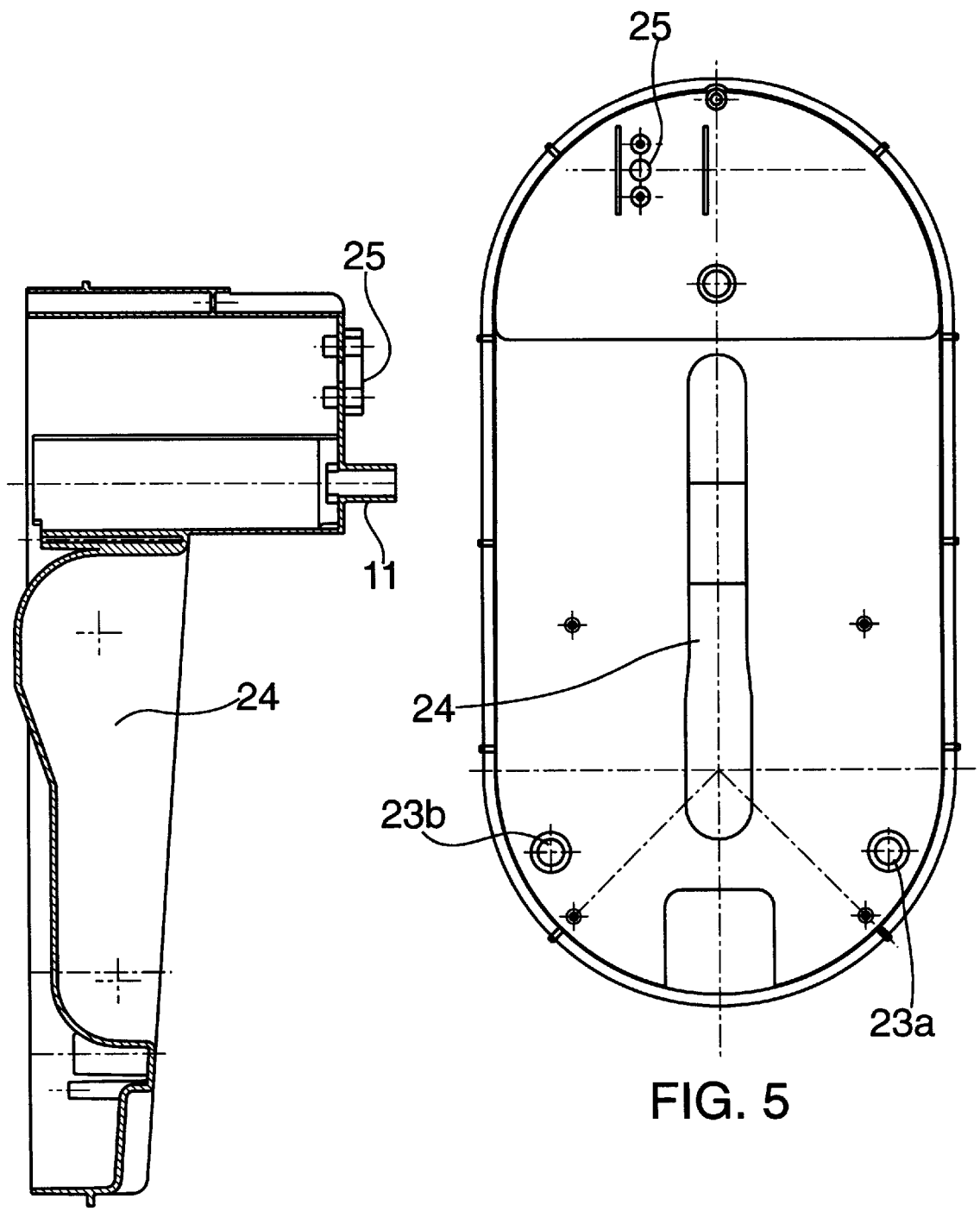
FIG. 4 is a side section view of the water tank.
FIG. 5 is a bottom view of the water tank assembly.

The preferred configuration of the water tank (4) is shown in FIGS. 2–5. FIG. 2 shows a side view of the water tank (4), having ribs (21a, 21b) for locating and securing the water tank (4) within the housing (1) in a fixed position so that the water tank (4) may be operably connected with the appropriate functional parts of the device, including the inlet tube (11), the float box (5) and micro-switch (7). FIG. 3 shows a top view of the water tank (4), which shows the water outlet (22) which allows water to flow out of the water tank (4) to the dropper pin (10). FIG. 3 also shows water overflow outlets (23a, 23b) employed to prevent the water tank 4 from overflowing. The water tank (4) also has a spacing (23) formed therein to accommodate a portion of the water outlet tube (12). The shape of the spacing (24) can be seen in greater detail in FIG. 4, which is a side section view of water tank (4). The underside of the water tank (4), including spacing (24) can be seen in FIG. 5. FIG. 3 and FIG. 5 show the positioning of the mounting holes (25) for the float box (5) and micro-switch (7) within the water tank (4). FIG. 3 shows screw bosses (26a–26f) that provide means for assembling and securing the water tank (4) to the housing (1).

OPERATION OF THE PREFERRED EMBODIMENT

A conventional, paper-type filter (not shown) is placed in the filter basket (15). Ground beverage making material is then introduced into the paper-type filter. The water-flow speed control knob (18) is adjusted to the desired water circulation rate within the device for either decaffeinated or regular coffee. The decanter (16) may be used to obtain and introduce a desired amount of water to the water inlet (2), or a separate means may be employed. The empty decanter (16) is placed on the keep-warm heating plate (19). The water inlet cover (3) is raised to the open position to allow introduction of water into the water inlet (2). The water enters the water inlet and proceeds into the water tank (4). A main power switch (not shown) is activated and the switch light (not shown) will light upon activation of the power switch. The activation of the main power switch allows electricity to flow through the circuit, where the float box (5) is buoyed by the water in the water tank (4), thus raising the lever (6) to engage the micro-switch (7) to close the circuit. The switch for the keep-warm heating plate (19) is activated so that the decanter or carafe (16) is heated to the desired temperature so that the temperature of the brewed beverage may be maintained at a preferred minimum of eighty-five degrees centigrade.

When the micro-switch (7) is engaged to close the circuit, the heater (8) begins to heat the water contained in the water bladder (9) and the heater (8) rapidly vaporizes the water in the water bladder (9) continuously. The water vapor will pass out of the water bladder (9) and into and partially through the water outlet tube (12). While the water vapor is passing through the water outlet tube (12) it will condense into heated water, and the heated water will be collected in the water outlet chamber (13). From the water outlet chamber (13) the condensed, heated water will pass through perforations in a shower nozzle plate (14), and into the filter basket (15). Within the filter basket (15) containing a filter and beverage making material, the heated water will combine with the beverage making material to produce a flavored, infused beverage. The flavored, infused beverage will pass through the filter and through an opening in the lower portion of the filter basket (15) and into the heated decanter or carafe (16).

As the water level in the water tank (4) subsides, the float box (5) will gradually return to the position it occupied before the introduction of water into the water tank (4) as the water tank (4) is drained. As the float box (5) sinks, the lever (6) attached to the float box (5) will disengage the micro-switch (7), causing the circuit to open and power to be interrupted to the heater (8). Thus the brewing cycle is completed and power to the heater shut off until more water is introduced into the water tank (4) to start the brewing cycle.

Since other modifications or changes will be apparent to those skilled in the art, there have been described above the principles of this invention in connection with specific apparatus, it is to be clearly understood that this description is made only by way of example and not as a limitation to the scope of the invention.

What is claimed is:

1. A beverage making machine comprising:

a housing carrying a water tank;

a current supply circuit supplying current to a heater;

the heater heating water supplied from the water tank so as to convert supplied water to water vapor;

a water outlet tube;

the water vapor entering the tube and being transported and condensed in the tube;

condensed water vapor collected at a top portion of the tube adjacent an outlet chamber and having a temperature sufficient to brew an infused beverage;

a float box located within the water tank and of sufficient buoyancy to rise and fall with a level of water in the water tank; and a micro-switch operably engaged by the float box so as to open the current supply circuit when the float box is at a lowest level within the water tank and interrupt current to the heater.

2. A beverage making machine according to claim 1, where the float box is formed of a thermoplastic resin.

3. A beverage making machine according to claim 1 where the heater is coil shaped.

4. A beverage making machine according to claim 1, where the water tank comprises ribs for locating and securing the water tank within the housing.

5. A beverage making machine according to claim 1, further comprising a water-flow speed control knob carried on the housing, and a dropper pin disposed between the water tank and the water heater, for controlling a rate of flow of water from the water tank to the heater.

6. A beverage making machine according to claim 1, where the heater is configured to heat water within a water bladder.

7. A beverage making machine according to claim 6, further comprising a thermostat operably engaged with an exterior surface of the water bladder to open the current supply circuit when a temperature of the exterior surface of the water bladder exceeds a pre-selected temperature.

8. A method of brewing an infused beverage comprising the steps of:

introducing water into a water tank containing a float box;

activating a brewing cycle by raising the float box to close a current supply circuit;

allowing water in the water tank to pass into a water bladder;

heating the water in the water bladder until the water is vaporized in the form of water vapor;

transporting and condensing the water vapor in a tube, where the water vapor is condensed into heated water; and collecting the heated water at a top portion of the tube and introducing the heated water to a beverage making material.

9. A method of brewing an infused beverage according to claim 5, further comprising the steps of:

extracting an infused hot beverage from the introduction of heated water to the beverage making material; and directing the infused hot beverage into a decanter.

* * * * *

UNITED STATES PATENT AND TRADEMARK OFFICE
CERTIFICATE OF CORRECTION

PATENT NO. : 6,279,458 B1
DATED : August 28, 2001
INVENTOR(S) : John C.K. Sham and Kumkit Kunavongvorakul Page 1 of 1

It is certified that error appears in the above-identified patent and that said Letters Patent is hereby corrected as shown below:

Column 6, claim 9,
Line 45, claim 9 depends from claim 8, and the internal numeral should be 8, instead of 5.

Signed and Sealed this

Ninth Day of April, 2002

Attest:

Attesting Officer

JAMES E. ROGAN
Director of the United States Patent and Trademark Office